United States Patent Office.

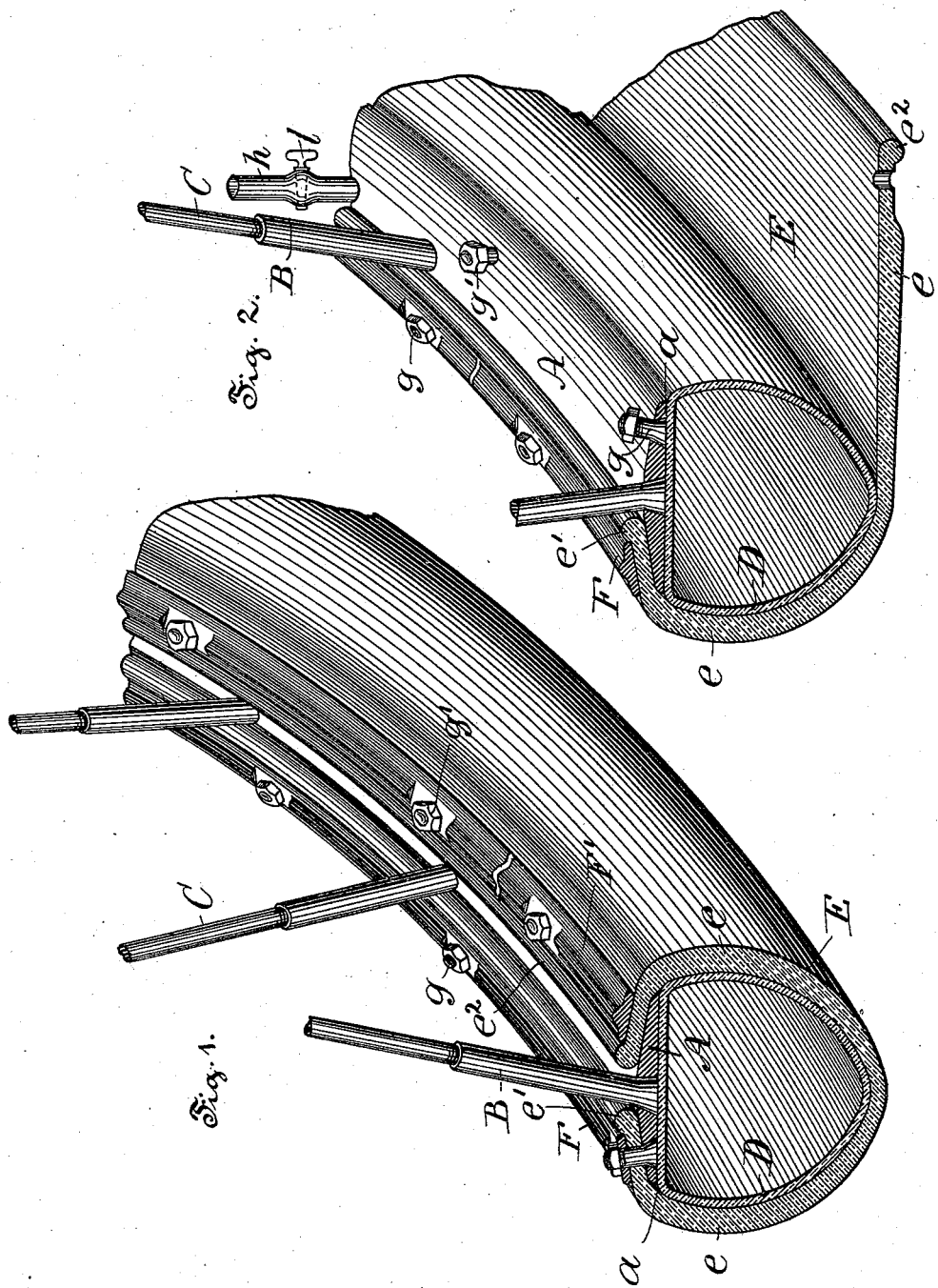

KIRK BROWN, OF PHILADELPHIA, PENNSYLVANIA.

INFLATABLE TIRE FOR VEHICLE-WHEELS.

SPECIFICATION forming part of Letters Patent No. 485,605, dated November 8, 1892.

Application filed November 10, 1891. Serial No. 411,438. (No model.)

*To all whom it may concern:*

Be it known that I, KIRK BROWN, a citizen of the United States, residing at the city of Philadelphia, in the county of Philadelphia and State of Pennsylvania, have invented certain new and useful Improvements in Inflatable Tires for the Wheels of Vehicles, of which the following is a specification.

My invention has relation to that class of tires composed of compressible or elastic material in contradistinction to those made of metal and of such type as are capable of being inflated by means of air, gas, or other aeriform or gaseous fluid.

My invention in general is applicable to the road-wheels of carriages or other somewhat similar rolling conveyances, but more especially adapted for use in connection with the road-wheels of bicycles, tricycles, and velocipedes.

The principal objects of my present invention are, first, to provide a comparatively-inexpensive, durable, and efficient tire adapted to be readily inflated, and, second, to provide a tire adapted to be inflated and so constructed and the parts thereof so arranged and clamped to the felly or rim of the wheel of the vehicle or other rolling conveyance as that in case of leakage of the same it may be readily repaired and restored to its normal or inflated condition for use without removing the entire tire from the felly or rim of the wheel for the purpose.

My invention consists of an inflatable tire having an inner tube suitably secured to the felly or rim of a wheel and provided with an outer covering suitably applied to said inner tube and supported on said felly or rim by means of sectional rails suitably clamped thereto.

My invention further consists of an inflatable tire provided with an inner tube secured to the face of the felly or rim of a wheel and with a surrounding covering supported on the back of said felly or rim by sectional rails and with means for clamping the same to said felly or rim.

My invention further consists of an inflatable tire provided with an inner tube of compressible or soft elastic material secured to the rim or felly of a wheel and with a surrounding covering of a tougher material than the inner tube and thickened from the tread portion thereof to about the points of contact of the same with the peripheral surface of the felly or rim of a wheel and supported in position thereon by sectional rails provided with clamping and unclamping devices.

My invention further consists of an inflatable tire having an inner tube and an outer covering and the inner tube preferably made of a softer material than the outer or surrounding covering, thickened from the tread portion to near or about the points of contact of the same with the felly or rim of the wheel by means of sectional rails secured thereto by means of bolts and nuts in such manner as to permit in case of leakage of the aeriform or gaseous fluid through the inner tube of the same being readily repaired by removing a section or sections of the rails and withdrawing a portion or portions of the outer or surrounding covering of the tire for such purpose; and my invention further consists of the improvements in inflatable tires hereinafter described, and pointed out in the claims.

The nature and characteristic features of my invention will be more fully understood from the following description, taken in connection with the accompanying drawings, forming part hereof, and in which—

Figure 1 is a perspective view of a section of my improved inflatable tire, showing the inner tube and the outer or surrounding cover supported in position between the sectional rails against the peripheral surface of the felly or rim of the wheel by means of bolts and nuts, and also showing the outer or surrounding covering of the tire thickened in both directions from the tread portion to or about the points of contact of the same with the felly or rim of the wheel and the supporting sectional rails; and Fig. 2 is a similar view embodying the features of my present invention, showing a section of the outer or surrounding covering of the tire withdrawn therefrom in order to illustrate how the inner tube may be repaired in case of leakage by simply removing the sectional rails, bolts, and nuts supporting said surrounding covering in position between the peripheral surface of the rim or felly of the wheel and the supporting sectional rails.

Referring now to the drawings, A is the rim or felly of the wheel, made of any suitable material and of any preferred construction.

B is the spoke-nipples, and C are the spokes.

D is the inner tube, made, preferably, of rubber or other compressible or elastic material.

E is the outer or surrounding covering, composed of rubber and canvas or other suitable material or materials and preferably made of tougher material than the inner tube, and also so that the portion around about the tread will be of less thickness of material than along the sides or surfaces therefrom to the points of contact of said covering with the peripheral surface of the felly or rim A of the wheel. In practice it has been found that the best results are attained by thickening the outer covering E from the part or portion forming the tread, for the reasons hereinafter more fully explained. It has also been found in practice that the inner or bowl-shaped tube D of the drawings is more apt to become perforated at or near the respective points of contact of the same with the rim or felly A, and even along the sides or surfaces beyond what might be termed the "tread portion" thereof, thus causing the air or gas to escape; but such can be avoided in a great measure by thickening the outer or surrounding covering on the sides or surfaces beyond the tread portion proper, which renders the escape of air or gas in the event of the perforation of the inner tube much more difficult. The outer or surrounding covering E, loosely adhering to the inner tube D, is then drawn in a suitable manner over the peripheral surface of the rim or felly A and sectional rails F and F', mounted thereon and firmly supported in position by means of bolts $g$, inserted through the rim or felly A, and the rails with nuts $g'$ applied thereto for firmly clamping and holding the outer covering to the rim or felly A of the wheel.

In order to inflate the tire, there is employed a tube $h$, which is inserted through the rim or felly A and the inner tube D, and this tube is preferably provided with a small cock $h'$, or, if preferred, other means for inflating the tire may be employed. At the extremital portions of the outer covering E are provided enlargements or bearings $e'$ and $e^2$, in order that when the covering is secured to place between the felly or rim A and the sectional rails F and F' the same will be prevented from slipping, and these enlargements also afford, in case the covering may have to be removed for any purpose, means whereby the same may be readily handled for effecting the removal thereof.

Heretofore great difficulty, owing to the construction of inflatable tires, has been experienced in instances of leakage of the inflating fluid therefrom, and it has been found next to impossible to repair the tire to avoid further loss of the inflating fluid while on the road without removing the entire tire and providing the wheel with an entirely-new one; but by use of my invention these serious, expensive, and time-consuming objections and disadvantages attending upon the use of inflatable tires on rolling conveyances is overcome, because in case of leakage repairs to the tire can be readily and inexpensively, both as to time and labor, corrected or overcome by the cyclist or roadster simply removing one or more sections of the rails F and F' and the outer covering E at the points where the aeriform or gaseous fluid may be escaping from the inner tube D and applying or cementing to the outer surface of the inner tube D a strip of rubber or other suitable elastic material and then restoring the outer covering E and returning the rails F and F' to their normal position and bolting the same again to the felly or rim A for clamping and holding the covering firmly against the rim or felly A of the wheel, when the tire is again ready to be inflated for use.

It will be obvious to those skilled in the art to which my invention appertains that as to minor details modifications may be made without departing from the spirit of the invention, and therefore I do not wish to be understood as limiting myself to the precise arrangement of the parts as hereinbefore explained.

Having thus described the nature and objects of my invention, what I claim as new, and desire to secure by Letters Patent, is—

1. An inflatable tire comprising an inner tube applied to the face of the felly or rim of a wheel and a covering surrounding the inner tube and supported on the back of said felly or rim by sectional rails provided with detachable clamping devices, for the purposes set forth.

2. An inflatable tire comprising an inner compressible or soft elastic material tube applied to the face of the felly or rim of a wheel and a covering of tougher material surrounding the inner tube and supported on the back of the felly or rim by sectional rails provided with clamping means, substantially as shown, and for the purposes set forth.

3. A tire consisting of an inner tube composed of compressible or soft elastic material applied to the face of the rim of a wheel, a covering of tougher material surrounding and supported on the back of the rim by sectional rails provided with detachable clamping devices, and means for inflating said tire, substantially as shown, and for the purposes set forth.

4. An inflatable tire provided with an inner tube secured to the rim of a wheel and having a surrounding covering increasing in thickness from the tread to about the rim supporting the same and provided with enlargements at the extremities thereof, and sectional rails mounted on said covering and suitably secured thereto and to said rim, substantially as and for the purposes set forth.

5. An inflatable tire composed of an inner tube secured to a rim of a wheel and having a surrounding covering applied thereto and thickened from the tread to about the points of contact of the same with the rim, sectional rails applied thereto, and means for clamping and unclamping the rails, substantially as and for the purposes set forth.

6. An inflatable tire provided with an inner tube secured to the rim of a wheel, a surrounding covering applied thereto and thickened from the tread portion thereof and with enlargements at the extremital parts thereof, sectional rails supported on said rim, and means for clamping and unclamping the same, substantially as and for the purposes set forth.

In witness whereof I have hereunto set my signature in the presence of two subscribing witnesses.

KIRK BROWN.

Witnesses:
THOMAS M. SMITH,
RICHARD C. MAXWELL.